United States Patent [19]
Crane

[11] 4,169,594
[45] Oct. 2, 1979

[54] HOLLOW ARTICLES

[75] Inventor: John C. Crane, Links View, England

[73] Assignee: The Mettoy Company Limited, Northampton, United Kingdom

[21] Appl. No.: 831,930

[22] Filed: Sep. 9, 1977

[30] Foreign Application Priority Data

Sep. 16, 1976 [GB] United Kingdom ............ 38438/76

[51] Int. Cl.² ................. A63B 41/00; B28B 1/02; B32B 7/02
[52] U.S. Cl. .................. 273/58 BA; 273/DIG. 5; 273/DIG. 6; 273/DIG. 9; 264/310; 264/311; 428/217; 428/475; 428/483; 428/520; 428/35
[58] Field of Search ................ 264/310, 311; 273/58 BA, 58 J, 65 ED; 428/217, 474, 483, 520, 35

[56] References Cited

U.S. PATENT DOCUMENTS

| | | | |
|---|---|---|---|
| 3,095,261 | 6/1963 | Meyer | 273/58 BA |
| 3,246,069 | 4/1966 | Maynard | 264/310 |
| 3,635,749 | 1/1972 | Eaddy | 428/474 |
| 3,976,821 | 8/1976 | Carrow et al. | 428/474 |
| 4,070,434 | 1/1978 | Noda | 264/310 |

*Primary Examiner*—William R. Dixon, Jr.
*Attorney, Agent, or Firm*—Watson, Cole, Grindle & Watson

[57] ABSTRACT

A laminated material suitable for use in inflatable playballs comprises a first layer of thermoplastic synthetic resin and a second layer. The second layer is formed of two thermoplastic resin materials, one having a tensile strength greater than the material of the first layer and forming a lattice structure and the other filling the interstices of the lattice structure, the filling material being exposed at one surface of the second layer and bonded at that surface to the first layer.

18 Claims, 2 Drawing Figures

HOLLOW ARTICLES

This invention relates to laminated synthetic resin plastic materials, articles composed of such materials, and methods of producing the materials and articles.

In certain applications a plastic material which has certain desirable properties, such as texture, decorability and ability to withstand deterioration with age and exposure, for example by cracking or flaking, does not have other desirable properties, such as strength.

For example, in the specific area of inflatable sports balls, polyvinyl chloride (P.V.C.) is commonly employed because of its texture (or "feel"), resilience, the ease with which it can be decorated and its resistance to cracking or flaking with age and exposure. However, a sports ball made of P.V.C. is not dimensionally stable, particularly if inflated to the pressures which players expect, for example, from leather footballs.

We have discovered that a first layer of such a material can be laminated to a second layer which can provide a good bond with the first layer and provide desired qualities of strength, particularly tensile strength, and hardness.

In accordance with the invention, there is provided a laminated material comprising a first layer of thermoplastic synthetic resin material, and a second layer, wherein the second layer comprises a lattice structure of a first thermoplastic resin having a tensile strength greater than that of the material of the first layer and a second thermoplastic resin which fills the interstices of the lattice structure, said second resin being exposed at one surface of the second layer and being bonded to the adjacent face of the first layer.

The first and second materials of the second layer can be chosen to provide a desired bonding between the layers and to provide desired properties, for example tensile strength and hardness.

In an embodiment of the invention described in more detail below, a sports ball is formed of laminate material in which the second layer is a mixture of thermoplastic polyester elastomers having different tensile strengths and hardnesses. By varying the ratio of the elastomers, the properties of the sports ball, for example the tensile strength, hardness and rebound properties can be varied to suit the use of the ball, such as for football (soccer), rugby football, netball or basketball.

In another embodiment, the first layer is P.V.C. and the second layer is a mixture of nylon 11 and P.V.C., the P.V.C. of the second layer providing a good bond with the first layer.

In the case of an inflatable sports ball, the outer layer or shell is reinforced internally by the inner layer which is in turn protected against weathering and abrasion by the impermeable outer layer.

DESCRIPTION OF THE DRAWING

Some embodiments of the invention will now be described, by way of example, with reference to the accompanying drawings, in which.

DETAILED DESCRIPTION OF THE PREFERRED EMBODIMENTS

Figure 1:
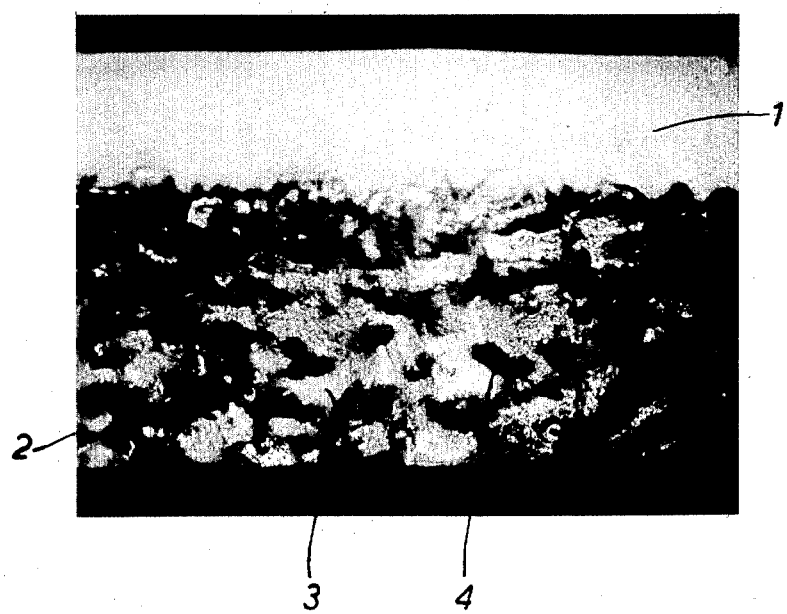
FIG. 1 is a photograph of a typical section through a laminate material according to the invention.

The material of FIG. 1 comprises an outer layer 1 of a first material, preferably P.V.C., and an inner layer 2 which is formed of two materials. One material of the inner layer, having a tensile strength greater than the material of the first layer, forms a lattice 3 and the other material of the inner layer fills in, as at 4, the lattice structure and has a substantial surface area in contact with the first layer to obtain a good bond between the two layers.

The inner layer 2 thus consists effectively of two interlocked lattice structures.

Figure 2:
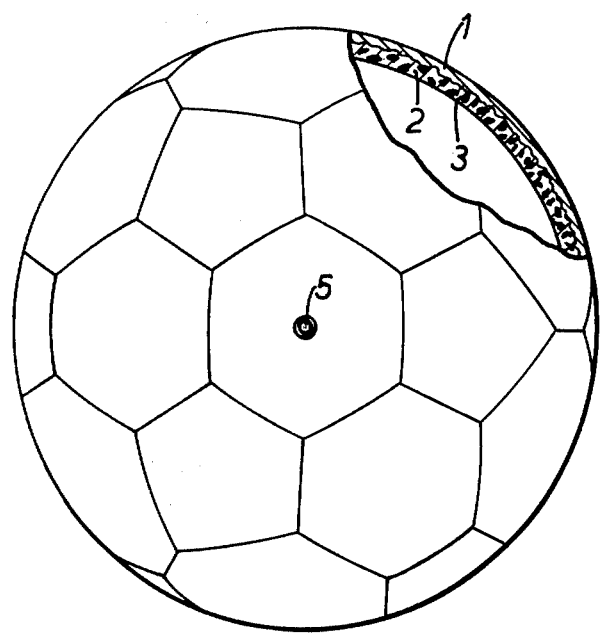
FIG. 2 is a partly sectional view of a football using the material illustrated in FIG. 1.

Some methods of forming the inflatable sports ball of FIG. 2 will now be described, by way of example.

In each of the first two methods described in detail below, we employ for the inner layer nylon 11 to form the lattice structure and a P.V.C. compound to fill in the interstices of the lattice. The P.V.C. compound is in powder form and is of the following formulation:

P.V.C.: 100 pts. wt.
DIOP (Di-iso-octyl phthalate): 70 pts. wt.
Epoxy plasticizer: 5 pts. wt.
Stabilizer: 3 pts. wt.

The compound is used in the form of finely divided particles in a size range of 300 to 1,000 microns. This is intimately blended with the nylon 11 powder having an average particle size of 200 microns. These two powders are thoroughly blended in equal proportions by weight.

Raw material for the outer layer, or shell, is in the form of a plastisol of the following formulation:

P.V.C. (paste grade): 100 pts. wt.
DIOP: 75 pts. wt.
Epoxy plasticizer: 5 pts. wt.
Stabilizer: 3 pts. wt.
Pigments: q.s.

For a ball of some 8½ inches diameter we use some 200 grams of this plastisol and 200 grams of the P.V.C./nylon mixture.

A conventional rotational casting mould is charged with the plastisol and subjected to a temperature of 160° C. (preferably in a hot air stream) for some 7 minutes, to convert the plastisol from a liquid to a partially fused solid state and the mould is then opened, the partially fused shell rupturing easily in the region of the separated half-mould edges.

The pre-blended powder is pre-heated preferably and then placed in the mould, the mould is closed and heating is continued in an air temperature of 350° for 7 minutes. During this second phase of heating, the outer case fuses completely to repair the rupture effected on opening the mould. Furthermore, the P.V.C. powder in the powder mixture starts to melt at about 190° C. and at about the same temperature the nylon 11 melts rapidly and flow due to relatively low viscosity through the interstices in the P.V.C. particles while the latter fuse together at their points of mutual contact, and also with the outer P.V.C. shell whose fusion is completed during the second phase of heating. Pre-heating of the P.V.C./nylon mixture reduces the total heat input required in the second phase of heating and reduces the risk of degrading the outer P.V.C. layer.

When heating has been completed, the mould is cooled and opened and the product removed and fitted with an inflation valve 5, a housing having been provided for the valve in the moulding process, for example in accordance with the teachings of British Patent Specification No. 973431. Inflation can be effected immediately or at any other convenient time.

The mould size is only slightly less than that of the finished and inflated ball since the wall will not stretch to any significant degree, due to the tensile (circumferential) strength of the nylon lattice structure.

In a second method, we avoid the necessity of adjusting temperatures between the two heating phases. In this method, the empty mould is pre-heated at 350° C. for 7 minutes and then charged with P.V.C. in the form of a powder (known as dry-blend) corresponding approximately to the formulation given above for plastisol, or in the form of a finely divided compound. Dryblend is a mixture of resins, plasticisers etc. intimately mixed but in a dry, powder form with the resin unfused and in discrete form. The "finely divided compound" form is a P.V.C. mixture which has passed through one heating phase in which all components have been melted or fused together and the resultant mass has been ground to form a fine powder.

The mould is closed and rotated in knowm manner to distribute the powder over the internal mould surface, and residual heat in the mould partially sinters the powder and causes it to adhere to the wall of the mould. This phase takes about 4 minutes. The hot mould is opened and the P.V.C./nylon mixture is placed in the mould, heating and rotation continuing at 350° C. for some 7 minutes, this phase corresponding to the second heating phase described previously. Cooling and removal of the product are completed as above.

In another form of the invention, the inner layer is formed of two thermoplastic polyester elastomer materials, for example as marketed by Dupont under the Trade Mark "Hytrel" or by the Dutch Company AKZO under the Trade Mark "Arnitel".

The polyester elastomer materials preferably have Durometer hardnesses between about 40D and 65D and tensile strengths of from about 3500 psi to 5800 psi measured by the ASTM method D-638.

We presently prefer a 60%/40% (by weight) mixture of Hytrel 4056 and Hytrel 5526 which have hardnesses of 40D and 55D respectively and tensile strengths of 3700 psi and 5500 psi respectively.

In a specific example of making a standard size football, 113 grams of P.V.C. plastisol is charged into a mould and the mould is heated for 3 minutes at 250° C. and rotated to effect fusion of the P.V.C. and distribution over the internal surface of the mould as described above.

The mould is then opened, rupturing the P.V.C. layer and charged with an intimate mixture of 180 grams of Hytrel 4056 and 120 grams of Hytrel 5526, both in powder form and having a particle size of 35 mesh. The mould is reclosed and its rotation and heating are resumed to heal the rupture in the P.V.C. and complete its curing, and also to fuse the polyester mixture, which is distributed over the inner surface of the P.V.C. layer, with which it forms an intimate bond. This stage of the moulding process is carried out for 13 minutes at 250° C.

When curing of both layers is complete, the mould is cooled and opened and the ball removed.

With the above-described procedure it is found that the two Hytrel grades tend to maintain their identity in the inner layer to form the filled lattice structure, presumably due to the two grades having different viscosities at their fusion point so that particles of one layer tend to form globules which stick together, while those of the other layer form a more fluid mass which flows through the interstices between the globules.

Although a 60/40 mixture by weight of Hytrel 4056 and 5526 is presently preferred as the material for the inner layer of a soccer ball, other ratios could be used, particularly for balls for other games or sports. For example, the ratio could be quite different for a basketball ball where the ball is required to be bouncier than a soccer ball. Thus, the ratio of the different grades of Hytrel or Arnitel, or similar substances, could be changed to provide properties of, for example, hardness, tensile strength rebound properties and flexibility, suitable for a particular application. However, ratios in the range of 65/35 to 55/45 are preferred for sports ball applications.

The lattice structure obtained in each of the described methods is complete, with substantially no, or very few, voids containing air to provide maximum tensile strength and impact resistance and good air retention properties.

The finished product can be given a great variety of surface configuration, for example simulating the stitched seams of a leather football or rugby ball by configuration of the internal surface of the mould, and the P.V.C. outer layer or shell is readily decorated by spraying or otherwise, in known manner.

Although the invention has particular utility and advantages in relation to inflatable sports balls, it can also be applied to the manufacture of other inflatable articles, such as inflatable boats. Furthermore, the basic laminated material could be produced in sheet or strip form, for example using generally known spread-coating techniques in a two-stage application.

I claim:

1. A hollow article having a flexible wall consisting of laminated material comprising an outer first layer of thermoplastic synthetic resin material and an inner second layer comprising first and second thermoplastic synthetic resin materials; said first material having a tensile strength greater than said material of said first layer and said second material being exposed at one surface of said second layer and being bonded to the adjacent face of said first layer, and wherein each of said first and second materials form respective lattice structures which are mechanically interlocked, the material of one said structure filling the interstices of the other said structure.

2. A hollow article according to claim 1 including a valved inflation opening.

3. A hollow article according to claim 1, wherein said flexible wall is in the form of a playball.

4. A laminated material comprising a first layer of thermoplastic synthetic resin material and a second layer comprising a first and second thermoplastic synthetic resin materials; said first material having a tensile strength greater than said material of said first layer and said second material being exposed at one surface of said second layer and being bonded to the adjacent face of said first layer, and wherein each of said first and second materials form respective lattice structures which are mechanically interlocked, the material of one said structure filling the interstices of the other said structure.

5. A laminated material according to claim 4, wherein the material of said first layer is a thermoplastic rubber.

6. A laminated material according to claim 4, wherein the material of said first layer is polyvinyl chloride.

7. A laminated material according to claim 4, wherein said first layer is composed of the same material as said second resin of said second layer.

8. A laminated material according to claim 4, wherein said first material of said second layer is nylon 11.

9. A laminated material according to claim 4, wherein the first material of said second layer is a thermoplastic polyester elastomer.

10. A laminated material according to claim 9, wherein the second material of said second layer is a thermoplastic polyester elastomer which has different physical properties compared to the thermoplastic polyester elastomer of said first material.

11. A laminated material according to claim 10, wherein the first and second resins of said second layer have different Durometer hardnesses, said Durometer hardnesses ranging from about 40D to 65D.

12. A laminated material according to claim 11, wherein one of said resins of said second layer has a Durometer hardness of about 40D.

13. A laminated material according to claim 11, wherein one of said resins of said second layer has a Durometer hardness of about 55D.

14. A laminated material according to claim 10, wherein the first and second resins of said second layer have different tensile strengths, said tensile strengths ranging from about 3500 to 5800 psi.

15. A laminated material according to claim 14, wherein one of the resins of said second layer has a tensile strength of about 3700 psi.

16. A laminated material according to claim 14, wherein one of the resins of said second layer has a tensile strength of about 5500 psi.

17. A laminated material according to claim 4, wherein the first and second resins of said second layer are respectively mixed in the proportions of about 55 to 65% to 45 to 35% by weight.

18. A laminated material according to claim 4, wherein said first and second resins of the second layer are mixed in substantially equal proportions by weight.

* * * * *